US012105385B2

(12) United States Patent
Sagardoyburu et al.

(10) Patent No.: US 12,105,385 B2
(45) Date of Patent: Oct. 1, 2024

(54) METHOD FOR MANUFACTURING A DIGITAL DISPLAY DEVICE AND DIGITAL DISPLAY DEVICE

(71) Applicant: The Swatch Group Research and Development Ltd, Marin (CH)

(72) Inventors: Michel Sagardoyburu, Neuchâtel (CH); Simon Springer, Berne (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 17/511,980

(22) Filed: Oct. 27, 2021

(65) Prior Publication Data
US 2022/0197092 A1   Jun. 23, 2022

(30) Foreign Application Priority Data
Dec. 21, 2020 (EP) ..................... 20216139

(51) Int. Cl.
*G02F 1/1343* (2006.01)
*G02F 1/1335* (2006.01)
(Continued)

(52) U.S. Cl.
CPC .. *G02F 1/134309* (2013.01); *G02F 1/133502* (2013.01); *G02F 1/13439* (2013.01);
(Continued)

(58) Field of Classification Search
CPC ........... G02F 1/34309; G02F 1/133502; G02F 1/13439; G04G 9/06; H01L 51/52
See application file for complete search history.

(56) References Cited

U.S. PATENT DOCUMENTS

| 4,118,924 A | 10/1978 | Foellner |
| 4,599,251 A * | 7/1986 | Feller ........................ G03F 1/54 |
|  |  | 428/912.2 |

(Continued)

FOREIGN PATENT DOCUMENTS

| CN | 1112361 A | 11/1995 |
| CN | 105717783 A | 6/2016 |

(Continued)

OTHER PUBLICATIONS

European Search Report issued Jun. 8, 2021 in European Application 20216139.4 of Dec. 21, 2020 citing documents AA and AB therein, 3 pages (with English Translation of Categories of cited documents).

(Continued)

*Primary Examiner* — Ryan Crockett
(74) *Attorney, Agent, or Firm* — Oblon, McClelland, Maier & Neustadt, L.L.P.

(57) ABSTRACT

A method for manufacturing a digital display device which includes an optically active medium disposed between at least one electrode and a corresponding counter-electrode, the optical properties of the optically active medium being modifiable by applying an electric current or voltage between the at least one electrode and the at least one corresponding counter-electrode, the digital display device including a transparent display surface through which at least one piece of information displayed by this digital display device is perceptible, the manufacturing method including the step of providing the transparent display surface of the digital display device with at least one first and one second decorative and/or functional pattern, the first pattern having a thickness different from that of the second pattern. A digital display device provided with at least one (Continued)

first and one second decorative and/or functional patterns whose thicknesses are not the same.

16 Claims, 2 Drawing Sheets

(51) Int. Cl.
    *G04B 19/10*     (2006.01)
    *G04G 9/06*     (2006.01)
    *H10K 50/80*     (2023.01)

(52) U.S. Cl.
    CPC ............... *G04B 19/10* (2013.01); *G04G 9/06* (2013.01); *H10K 50/80* (2023.02)

(56) References Cited

U.S. PATENT DOCUMENTS

| | | | |
|---|---|---|---|
| 5,704,821 A * | 1/1998 | Mann | A63H 33/28 446/16 |
| 5,895,541 A * | 4/1999 | Kobayashi | G04D 3/0092 156/289 |
| 5,926,293 A * | 7/1999 | Ralli | G02F 1/133555 359/636 |
| 6,147,738 A | 11/2000 | Okamoto | |
| 6,181,062 B1 * | 1/2001 | Hiraishi | H05B 33/26 313/506 |
| 6,295,251 B1 * | 9/2001 | Sakai | G04B 19/065 368/232 |
| 2002/0033919 A1 | 3/2002 | Sanelle et al. | |
| 2004/0136038 A1 | 7/2004 | Holmes et al. | |
| 2004/0196416 A1 | 10/2004 | Cho et al. | |
| 2004/0240777 A1 | 12/2004 | Woodgate et al. | |
| 2005/0126917 A1 * | 6/2005 | Morimoto | G04D 3/0092 368/283 |
| 2005/0163940 A1 * | 7/2005 | Liang | H04M 1/0283 264/255 |
| 2008/0220224 A1 * | 9/2008 | Tokumoto | B32B 7/12 428/195.1 |
| 2009/0174855 A1 | 7/2009 | Andrews et al. | |
| 2009/0268566 A1 * | 10/2009 | Hiroe | G01D 13/02 368/239 |
| 2012/0170310 A1 * | 7/2012 | Bita | G02B 6/0065 362/613 |
| 2012/0244246 A1 * | 9/2012 | Nielsen | B82Y 10/00 264/220 |
| 2013/0187312 A1 | 7/2013 | Pauliac et al. | |
| 2014/0232974 A1 | 8/2014 | Tomkins | |
| 2015/0286085 A1 * | 10/2015 | Davis | G02F 1/13338 445/24 |
| 2015/0286089 A1 | 10/2015 | Soejima et al. | |
| 2016/0103531 A1 | 4/2016 | Kimura et al. | |
| 2016/0118370 A1 * | 4/2016 | Wu | H01L 27/3232 362/19 |
| 2016/0170246 A1 * | 6/2016 | Lu | G02F 1/133512 349/96 |
| 2016/0178807 A1 * | 6/2016 | Sagardoyburu | G04B 19/12 264/496 |
| 2016/0274275 A1 | 9/2016 | Kim et al. | |
| 2017/0255166 A1 * | 9/2017 | Suzuki | G04B 45/00 |
| 2019/0338425 A1 * | 11/2019 | McGill | C23D 13/00 |
| 2020/0142238 A1 | 5/2020 | Schindler et al. | |
| 2020/0142239 A1 | 5/2020 | Schindler et al. | |
| 2021/0240032 A1 * | 8/2021 | Jones | G02F 1/29 |

FOREIGN PATENT DOCUMENTS

| | | |
|---|---|---|
| CN | 111142361 A | 5/2020 |
| JP | 6-265862 A | 9/1994 |
| JP | 2004-163482 A | 6/2004 |
| JP | 2015-041021 A | 3/2015 |
| JP | 2015-153320 A | 8/2015 |
| JP | 2016-118538 A | 6/2016 |
| KR | 20170033478 A | 3/2017 |
| KR | 20170133740 A | 12/2017 |

OTHER PUBLICATIONS

Japanese Office Action issued on Nov. 8, 2022 in Japanese Patent Application No. 2021-183844 (with English translation), citing references 1-2 and 15-16 therein, 29 pages.

Chinese Office Action issued in Chinese Patent Application No. 202111585799.1 on Apr. 25, 2024, (w/ English Translation), citing documents 1-21 therein.

\* cited by examiner

METHOD FOR MANUFACTURING A DIGITAL DISPLAY DEVICE AND DIGITAL DISPLAY DEVICE

CROSS-REFERENCE TO RELATED APPLICATION

This application claims priority to European Patent Application No. 20216139.4 filed on Dec. 21, 2020, the entire disclosure of which is hereby incorporated herein by reference.

TECHNICAL FIELD OF THE INVENTION

The present invention relates to a method for manufacturing a digital display device as well as a digital display device. The present invention relates in particular to a manufacturing method for providing a digital display device with a decorative and/or functional pattern.

TECHNOLOGICAL BACKGROUND

The present invention focuses on digital type display devices, that is to say display devices which are capable of displaying pieces of information in alphanumeric form, as opposed to analogue display devices that display pieces of information by means of one or more hands that move next to graduations.

A well-known family of digital display devices includes liquid crystal display devices. These liquid crystal display devices conventionally comprise a transparent front substrate located on the viewer's side, and a rear substrate, which is transparent or not, which extends parallel to and away from the front substrate. These two front and rear substrates are usually joined together by means of a sealing frame which delimits a tight enclosure wherein a liquid crystal composition is confined. Finally, the front and rear substrates are coated on their opposite faces with electrically conductive transparent electrodes and counter-electrodes; by applying an electric field between an electrode and a corresponding counter-electrode, the optical properties of the liquid crystal composition are modified at the point of intersection of the electrode and the counter-electrode in question.

Another well-known family of digital display devices includes Organic Light-Emitting Diode display cells also known by their name OLEDs. These are monolithic semiconductor components that conventionally comprise a series of organic thin films sandwiched between two electrically conductive thin film electrodes. When an electric current is applied to an OLED component, an electric field is created between the two electrodes under the effect of which the charge carriers, electrons and holes, migrate from the electrodes in the organic thin films until they recombine in an emissive area, by forming excitons, that is to say electron-hole pairs bonded by Coulomb forces. Once formed, these excitons, or excited states, relax to a lower energy level by emitting photons (electroluminescence) and heat, thus producing a light signal perceptible by the human eye through that of the electrodes which is arranged on the exit face of the OLED component.

More generally, the present invention therefore focuses on digital display devices which comprise an optically active medium disposed between at least one electrode and a corresponding counter-electrode, the optical properties of the optically active medium being modifiable by applying a current or a voltage between the at least one electrode and the at least one corresponding counter-electrode.

Digital display devices of the kind briefly described above equip in particular many wearable objects such as wristwatches, thus offering an alternative to wristwatches provided with a dial above which hands move.

Among the advantages provided by digital display devices, mention may be made of their lightness, their very low power consumption or else the possibility of displaying pieces of information in alphanumeric form, which appeals to a large part of consumers, especially among the youngest of them.

However, digital display devices, in particular liquid crystal display devices, also have some disadvantages, first and foremost being their boring and repetitive appearance. With liquid crystal display devices, the combinations of aspects, colours, materials, shapes and others offered by the dials of wristwatches with hands are indeed far removed. Indeed, the digital display devices all have more or less the same appearance and it is difficult to impart to a wristwatch equipped for example with a liquid crystal display device an aspect which will allow to distinctly distinguish it from a competitive liquid crystal display wristwatch.

SUMMARY OF THE INVENTION

The purpose of the present invention is to overcome the above-mentioned problems as well as others still by providing a method for manufacturing a liquid crystal display device which allows to impart to such a display device a more original appearance allowing it to stand out from the competitive liquid crystal display devices.

To this end, the present invention relates to a method for manufacturing a digital display device which comprises an optically active medium disposed between at least one electrode and a corresponding counter-electrode, the optical properties of the optically active medium being modifiable by applying an electric current or voltage between the at least one electrode and the at least one corresponding counter-electrode, the digital display device comprising a lower face and an upper face through which at least one piece of information displayed by this digital display device is perceptible, the manufacturing method comprising the step of providing the upper face of the digital display device with at least one first and one second decorative and/or functional pattern, the first pattern having a thickness different from that of the second pattern.

Thanks to these features, the present invention provides a manufacturing method allowing to obtain a digital display device, the face through which the pieces of information produced and displayed by this digital display device are perceptible is provided with at least one first and one second pattern, the thicknesses of which are different. These patterns of different thicknesses form reliefs on the surface of the digital display device which, through the effect of shadows and ambient light reflections on the ridges of the patterns, give volume to the face of the digital display device on which they are provided. This impression of volume is further reinforced by the fact that since the patterns do not have the same thickness, it gives a feeling of variable depth when examining the face of the digital display device which is provided with these patterns. Thus, depending on whether the area where the first pattern is located or the area where the second pattern is located is viewed, the observer has the impression that the pieces of information displayed in either one of the two areas are not at the same depth relative to the transparent display surface of the digital display device.

According to a particular embodiment of the invention, the at least one first and the at least one second pattern are directly formed on the transparent display surface of the digital display device by applying and structuring one or more layers of at least one photosensitive resin.

According to another particular embodiment of the invention, the layer(s) of at least one photosensitive resin are structured by photolithography.

According to yet another embodiment of the invention, the at least one first and the at least one second pattern are directly formed on the transparent display surface of the digital display device by:
- depositing a photo-polymerisable resin layer;
- replicating at least one first and at least one second pattern in the photo-polymerisable resin layer by means of a mould;
- curing the photo-polymerisable resin layer by exposure to light radiation, and
- removing the resin that has not been exposed to light radiation.

According to yet another embodiment of the invention, the photo-polymerisable resin is exposed to ultraviolet radiation.

According to yet another embodiment of the invention, the at least one first and the at least one second pattern are manufactured in a transparent plate in relief, then the transparent plate is attached on the display surface of the digital display device.

According to yet another embodiment of the invention, the transparent relief plate is produced by means of one of the following techniques:
- by injection of a plastic material;
- by deposition on the transparent plate of a photo-polymerisable resin layer, then replication of the at least one first and at least one second pattern in the photo-polymerisable resin layer by means of a mould, then curing of the photo-polymerisable resin layer by exposure to light radiation, and finally elimination of the resin which has not been exposed to light radiation;
- by hot stamping of the transparent plate, or
- by moulding the transparent plate using a two-component adhesive in a mould.

According to yet another embodiment of the invention, the thickness of the patterns is comprised between 1 μm and 1 mm.

According to yet another embodiment of the invention, the digital display device is a liquid crystal display cell or an organic light emitting diode display cell.

The invention also relates to a timepiece comprising a digital display device obtained by implementing the method according to the invention.

BRIEF DESCRIPTION OF THE FIGURES

Other features and advantages of the present invention will emerge more clearly from the following detailed description of an embodiment of the method according to the invention, this example being given purely in an illustrative and non-limiting manner only in connection with the appended drawing on which.

DETAILED DESCRIPTION OF THE INVENTION

The present invention proceeds from the general inventive idea which consists in providing the transparent display surface of a digital display device such as a liquid crystal display cell or else a display cell with organic diodes with at least one first and one second decorative and/or functional pattern which differ from one another by their thicknesses which are not the same. Due to their height difference, these first and second patterns give relief to the transparent display surface through which the pieces of information produced and displayed by the digital display cell are perceptible. Indeed, by reflecting on the rim of the first and second patterns, the light changes direction several times, which highlights the differences in heights between the first and second patterns and gives the impression that the pieces of information displayed by the digital display cell are in different planes, thus imparting to the transparent display surface a more luxurious and more elaborate appearance.

The present invention will be more particularly described in connection with a digital display device of the liquid crystal display cell type. It will nevertheless be understood that the present invention is not limited to this particular example and that it applies to any type of digital display device provided with a transparent display surface through which the pieces of information produced by this digital display device are perceptible. In particular, the organic light-emitting diode display cells are considered.

Figure 1:
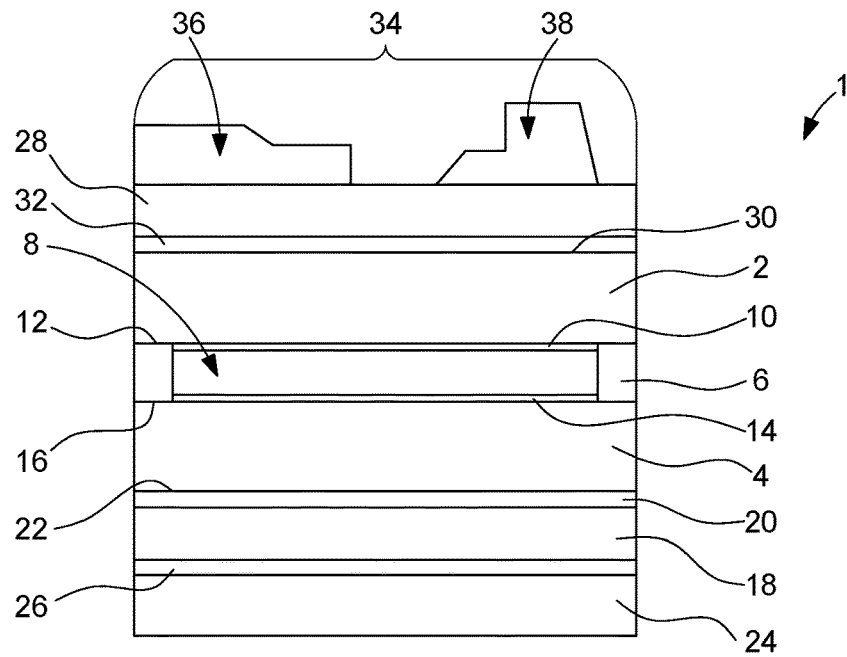
FIG. 1 is a sectional view of a liquid crystal display cell on the transparent display surface of which have been transferred a first and a second pattern of different thicknesses.

Referred to as a whole by the general reference numeral 1, the liquid crystal display cell shown in elevation and in section in FIG. 1 comprises a front substrate 2 and a rear substrate 4 which extends parallel to and at distance from the front substrate 2. The front substrate 2 through which the pieces of information produced and displayed by the liquid crystal display cell 1 are perceptible, is transparent, while the rear substrate 4 can also be transparent or opaque. In the example illustrated in FIG. 1, the rear substrate 4 is transparent and the front 2 and rear 4 substrates are made of plastic or glass.

The front 2 and rear 4 substrates are conventionally joined together by a sealing frame 6 which delimits a tight enclosure 8 for the confinement of a liquid crystal composition. At least one electrode 10 is structured on a lower face 12 of the front substrate 2 and at least one corresponding counter-electrode 14 is structured on an upper face 16 of the rear substrate 4. By application of an electric field between the at least one electrode 10 and the at least one counter-electrode 14, the optical properties of the liquid crystal composition are modified at the point of intersection of the electrodes in question. A transparent reflective polariser 18 is attached, for example by means of a layer of transparent adhesive 20, on an inner face 22 of the rear substrate, and a black film 24 is attached, for example by means of another layer of transparent adhesive 26, on the transparent reflective polariser 18. Finally, a transparent absorbent polariser 28 is attached to the upper face 30 of the front substrate 2, for example by means of yet another layer of transparent adhesive 32.

The front substrate 2 coated with the transparent absorbent polariser 28 forms the transparent display surface 34 through which the pieces of information generated by the liquid crystal display cell 1 are perceptible to the viewer. In accordance with the invention, the transparent display surface 34 of the liquid crystal display cell 1 is provided with at least one first and one second decorative and/or functional pattern 36, respectively 38, the first pattern 36 having a thickness different from that of the second pattern 38. The thickness of the first and second patterns 36, 38 is preferably comprised between 1 μm and 1 mm.

According to a first embodiment of the invention, the first and second patterns 36, 38 are directly formed on the transparent display surface 34 of the liquid crystal display cell 1 by applying and structuring one or more layers of at least one photosensitive resin. The photosensitive resin layer(s) are structured by photolithography. For example, a first resin layer of a first thickness is structured to form the first pattern 36, then a second resin layer of a second thickness different from the first thickness is structured to form the second pattern 38.

Figure 2A:
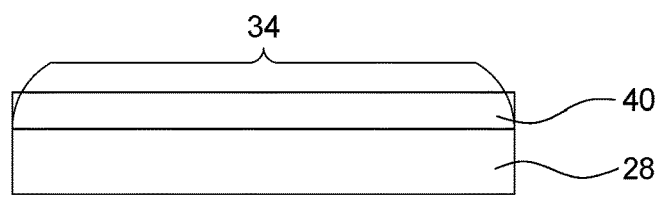
FIGS. 2A to 2D illustrate the steps of a method for manufacturing the first and second patterns by replication using a mould in a layer of photosensitive resin.
Figure 2B:
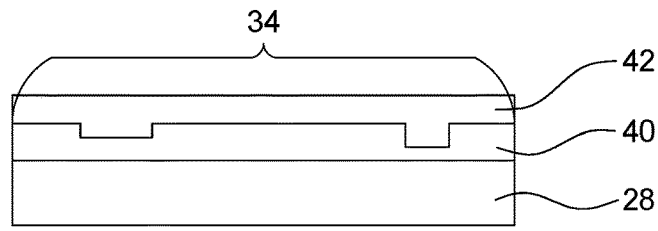
Figure 2C:
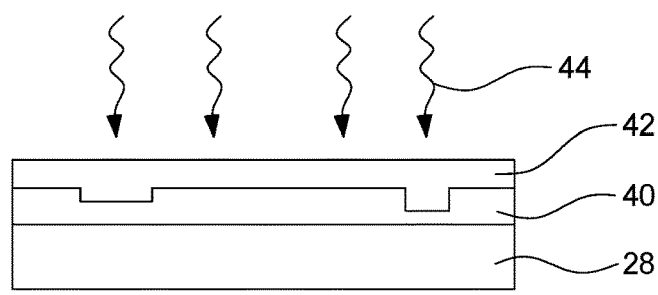
Figure 2D:
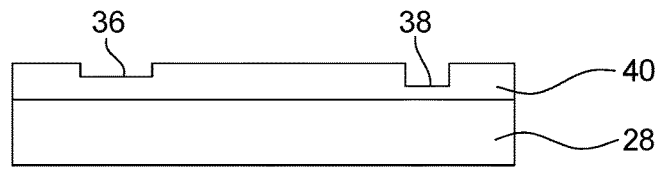

According to a second embodiment of the invention illustrated in FIG. 2A and subsequent figures, the first and second patterns 36, 38 are directly formed on the transparent display surface 34 of the liquid crystal display cell 1 by:
  depositing a photo-polymerisable resin layer 40 (FIG. 2A);
  replicating the first and second patterns 36, 38 in the photo-polymerisable resin layer 40 by means of a mould 42 (FIG. 2B);
  curing the photo-polymerisable resin layer 40 by exposure to light radiation 44 through the mould 42 (FIG. 2C), and
  removing the mould 42 (FIG. 2D).

As a preferred but non-limiting example, the photo-polymerisable resin is exposed to ultraviolet light radiation 44.

Figure 3:
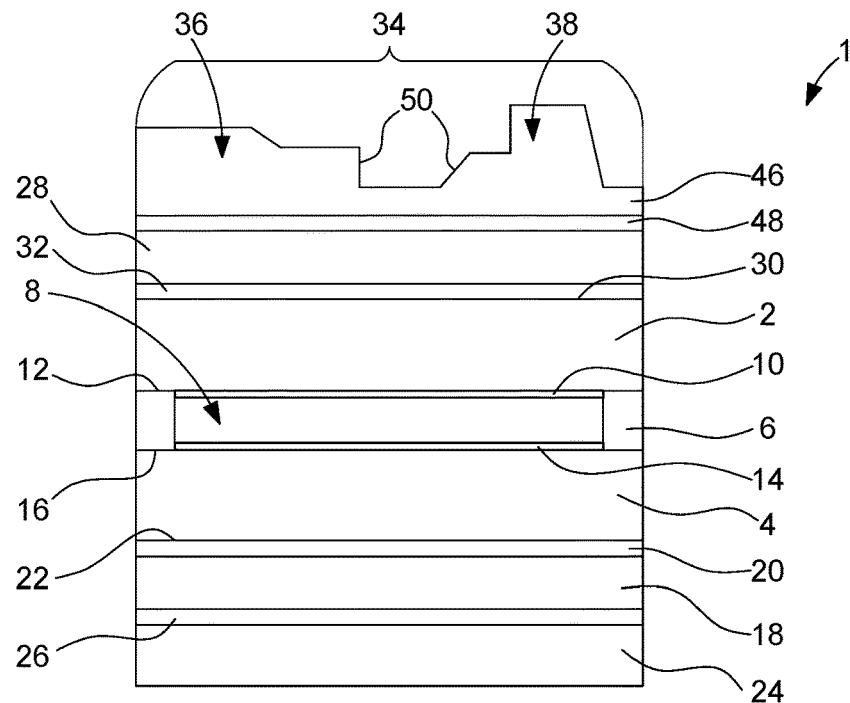
FIG. 3 is an elevational view in section of the liquid crystal display cell of FIG. 1 on the display surface of which is attached a transparent plate wherein are formed the first and second patterns.

According to a third embodiment of the invention illustrated in FIG. 3, instead of forming the first and second patterns 36, 38 directly on the transparent display surface 34 of the liquid crystal display cell 1, it is also possible to manufacture the first and second patterns 36, 38 in a transparent plate 46 in relief, then to attach this transparent plate 46 on the transparent display surface 34 for example by means of an optically transparent layer of adhesive 48.

The transparent plate 46 provided with its first and second patterns 36, 38 in relief can be obtained by means of one of the following techniques:
  by injection of a plastic material into a mould;
  by hot stamping of a transparent starting plate;
  by moulding using a two-component adhesive in a mould;
  by deposition, on a transparent base plate, of a photo-polymerisable resin layer, then by replication of the first and second patterns in relief in the photo-polymerisable resin layer by means of a mould, then by curing of the photo-polymerisable resin layer by exposure to light radiation through the mould, and finally removal of the mould.

A liquid crystal display cell 1 is thus obtained, the transparent display surface 34 of which receives, either directly or via a transparent plate 46, first and second patterns 36, 38 of different thicknesses. Consequently, when the light is reflected on the edges 50 of these first and second patterns 36, 38, it changes direction several times, which highlights the differences in heights between the first and second patterns 36, 38 and gives an impression of depth and a more luxurious and more elaborate appearance to the transparent display surface 34 of the liquid crystal display cell 1.

Figure 4:
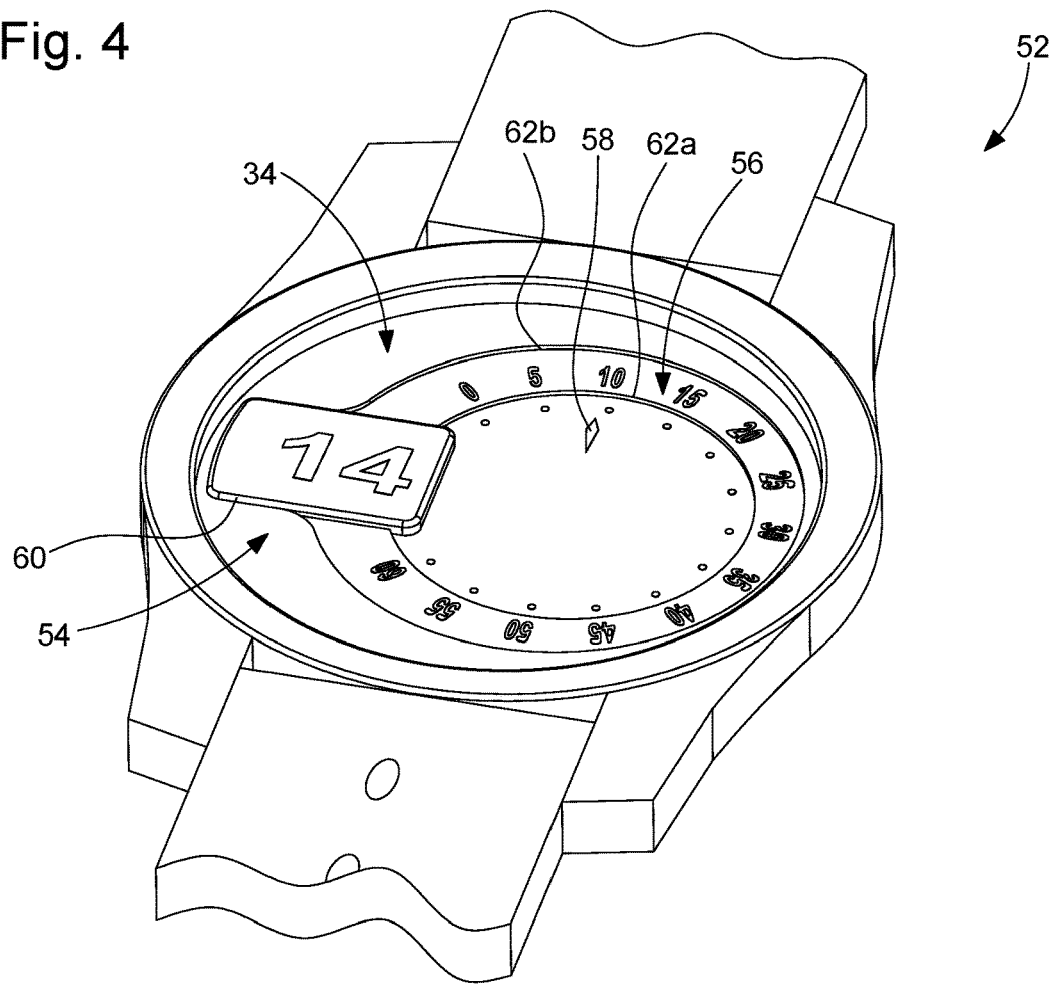
FIG. 4 is a top view of a wristwatch equipped with a liquid crystal display cell obtained by implementing the method according to the invention.

An example of a wristwatch 52 equipped with a liquid crystal display cell 1 according to the invention is illustrated in FIG. 4. As visible upon examining this FIG. 4, the transparent display surface 34 of the liquid crystal display cell 1 has a first display area 54 of rectangular shape which provides an indication of the current time, for example on a 24-hour basis. In this case, the first display area 54 indicates to the observer that it is 14 h. The transparent display surface 34 is also provided with a second display area 56 in the shape of a ring which indicates the minutes of the current hour by means of a graduation which runs from 5 minutes to 5 minutes. In this case, in the example shown in FIG. 4, a movable marker 58 points to the indication "10 minutes". It is therefore understood that the time indicated by the wristwatch 52 is 14 h10. According to the invention, the first display area 54 is surrounded over its entire perimeter by a first border 60, and the second display area 56 is surrounded over its entire circumference by an inner border 62a and an outer border 62b which are concentric relative to each other. According to the invention, the first border 60 is thicker, in other words higher, than the inner 62a and outer 62b borders. By the effect of the multiple reflections of the light on the edge of the borders 62a, 62b, a depth effect is obtained for the display areas 54 and 56, with the feeling that the second display area 56 is at a level lower than the first display area 54.

It goes without saying that the present invention is not limited to the embodiment which has just been described, and that various modifications and simple variants of the invention can be considered without departing from the scope of the invention as defined by the appended claims. In particular, it will be understood that although the invention has been described in connection with a liquid crystal display cell, it goes without saying that the invention is not limited to this single example and that it applies to other types of digital display devices such as, in particular, a display cell with organic light-emitting diodes on the transparent display surface of which can also be transferred at least one first and one second pattern, the thicknesses of which are different. It is also understood that, although in the example described, the first and second patterns are structured on a transparent absorbent polariser attached to the upper face of the front substrate of a liquid crystal display cell, this example is given in a purely illustrative and non-limiting manner, it being possible for these patterns to be structured for example on a transparent plate which is then attached to the polariser. It will also be understood that for the optical effect related to the reflection of ambient light to occur and to obtain the desired feeling of depth, at least two patterns of different thicknesses are required, the number of these patterns being able nevertheless to be much greater than 2. It will also be understood that it is necessary to ensure that the patterns are suitably aligned relative to the display areas of the digital display device. The patterns can also be made as repeating relief structures to imitate dial finishes encountered in the field of watchmaking such as brushed dials, clous de Paris or sunbrushed finishes and others. These patterns are made by applying and structuring one or more layers of at least one photosensitive resin. It is also interesting to give the upper surface of the patterns a polished finish in order to increase the reflections of the ambient light on these patterns and thus give even more volume to the transparent display surface of the digital display device by highlighting some areas of the display surface that are transparent relative to other areas. It will also be understood that the transparent display surface will be the more reflective the higher its optical refractive index. It is also possible to combine the patterns with antiglare treatments of the transparent display surface or the transparent plate. These antiglare treatments are, for example, of the "motheye" type and are obtained by nanometric, respectively micrometric, structuring of the transparent display surface or of the transparent plate. Another technique available for manufacturing the patterns is inkjet printing, also called Digital Printing. Depending on the thickness of the desired patterns, one or more layers of ink are applied and left to air dry, or else are oven-dried. The deposited ink can also be of the photo-polymerisable type.

NOMENCLATURE

1. Liquid crystal display cell
2. Front substrate
4. Rear substrate
6. Sealing frame
8. Tight enclosure
10. Electrode
12. Lower face
14. Counter-electrode
16. Upper face
18. Transparent reflective polariser
20. Transparent adhesive layer
22. Lower face
24. Black film
26. Layer of transparent adhesive
28. Transparent absorbent polariser
30. Upper face
32. Layer of transparent adhesive
34. Transparent display surface
36. First pattern
38. Second pattern
40. Photo-polymerisable resin layer
42. Mould
44. Light radiation
46. Transparent plate
48. Adhesive layer
50. Edges
52. Wristwatch
54. First display area
56. Second display area
58. Movable marker
60. First border
62a. Inner border
62b. Outer border

The invention claimed is:

1. A method for manufacturing a digital display device which comprises an optically active medium disposed between at least one electrode and a corresponding counter-electrode, the optical properties of the optically active medium being modifiable by applying an electric current or voltage between the at least one electrode and the at least one corresponding counter-electrode, the digital display device including a transparent display surface through which at least one piece of information displayed by said digital display device is perceptible, the manufacturing method comprising:
forming at least one first and one second decorative and/or functional pattern directly on the transparent display surface of the digital display device,
wherein the first pattern has a thickness different from that of the second pattern to thereby form reliefs in a height direction of the display device, the reliefs delimit edges and provide volume to a face of the digital display device due to reflections of ambient light,
wherein the first pattern and the second pattern each have a ring shape and are adjacent each other to form the transparent display surface, edges of the reliefs are continuously formed from the first pattern to the second pattern such that the edges of the reliefs extend continuously from an outer side surface of the first pattern to an inner side surface of the adjacent second pattern,
wherein the thickness of the at least one first and second patterns is comprised between 1 μm and 1 mm, and
wherein each of the first pattern and the second pattern have a plurality of thicknesses in the height direction.

2. The manufacturing method according to claim 1, wherein the at least one first and second patterns are directly formed on the transparent display surface of the digital display device by applying and structuring one or more layers of at least one photosensitive resin or by inkjet printing.

3. The manufacturing method according to claim 2, wherein the layer(s) of at least one photosensitive resin are structured by photolithography.

4. The manufacturing method according to claim 2, wherein the at least one first and one second patterns are directly formed on the transparent display surface of the digital display device by:
depositing at least one photo-polymerisable resin layer;
replicating at least one first and second patterns in the photo-polymerisable resin layer with a mould;
curing the photo-polymerisable resin layer by exposure to light radiation through the mould, and
removing the mould.

5. The manufacturing method according to claim 2, wherein the photo-polymerisable resin layer is exposed to ultraviolet radiation.

6. The manufacturing method according to claim 3, wherein the photo-polymerisable resin layer is exposed to ultraviolet radiation.

7. The manufacturing method according to claim 4, wherein the photo-polymerisable resin layer is exposed to ultraviolet radiation.

8. The manufacturing method according to claim 1, comprising the step of manufacturing the at least one first and second patterns in a transparent plate in relief, then attaching the transparent plate on the transparent display surface of the digital display device with an optically transparent layer of adhesive.

9. The manufacturing method according to claim 8, wherein the transparent relief plate is produced with one of the following techniques:
by injection of a plastic material;
by deposition on a transparent starting plate of a photo-polymerisable resin layer, then by replication of the at least one first and at least one second pattern in the photo-polymerisable resin layer with a mould, then by curing of the photo-polymerisable resin layer by exposure to light radiation through the mould, and finally removal of the mould;
by hot stamping of a transparent starting plate;
by moulding the transparent plate using a two-component adhesive in a mould, or
by inkjet printing.

10. The manufacturing method according to claim 1, wherein the digital display device is a liquid crystal display cell or an organic light emitting diode display cell.

11. The manufacturing method according to claim 1, wherein the at least one first and second patterns are made as repeating relief structures to imitate finishes of the brushed, sunbrushed, clous de Paris, corking and weaving dial type.

12. The manufacturing method according to claim 1, wherein the upper surface of the at least one first and second patterns is given a polished finish.

13. The manufacturing method according to claim 1, wherein the at least one first and second patterns are combined with an antiglare treatment of the transparent display surface or the transparent plate.

14. The manufacturing method according to claim 13, wherein the antiglare treatment is obtained by nanometric or micrometric structuring of the transparent display surface or of the transparent plate.

15. A timepiece comprising a digital display device obtained by implementing the method according to claim 1.

16. A digital display device comprising:
   an optically active medium disposed between at least one electrode and a corresponding counter-electrode, the optical properties of the optically active medium being modifiable by applying an electric current or voltage between the at least one electrode and the at least one corresponding counter-electrode; and
   a transparent display surface through which at least one piece of information displayed by said digital display device is perceptible, said transparent display surface being coated with at least one first and one second decorative and/or functional pattern,
   wherein the first pattern has a thickness different from that of the second pattern to thereby form reliefs in a height direction of the display device, the reliefs delimit edges and provide volume to a face of the digital display device due to reflections of ambient light,
   wherein the first pattern and the second pattern each have a ring shape and are adjacent each other to form the transparent display surface, the edges of the reliefs are continuously formed from the first pattern to the second pattern such that the edges of the reliefs extend continuously from an outer side surface of the first pattern to an inner side surface of the adjacent second pattern,
   wherein the thickness of the at least one first and second patterns is comprised between 1 µm and 1 mm, and
   wherein each of the first pattern and the second pattern have a plurality of thicknesses in the height direction.

* * * * *